US012800370B2

(12) United States Patent
Künzelmann et al.

(10) Patent No.: US 12,800,370 B2
(45) Date of Patent: Nov. 17, 2026

(54) FLOW MEASUREMENT APPARATUS

(71) Applicant: SICK Engineering GmbH, Ottendorf-Okrilla (DE)

(72) Inventors: Mario Künzelmann, Dresden (DE); Gerry Schroeter, Dresden (DE); Andreas Ehrlich, Dresden (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 329 days.

(21) Appl. No.: 18/600,346

(22) Filed: Mar. 8, 2024

(65) Prior Publication Data

US 2024/0302194 A1 Sep. 12, 2024

(30) Foreign Application Priority Data

Mar. 10, 2023 (EP) .................................... 23161323

(51) Int. Cl.
*G01F 1/667* (2022.01)
*G01F 1/325* (2022.01)

(52) U.S. Cl.
CPC ............ *G01F 1/667* (2013.01); *G01F 1/3282* (2022.01)

(58) Field of Classification Search
CPC ......... G01F 1/667; G01F 1/3282; G01F 1/662
USPC ...................................................... 73/861.27
See application file for complete search history.

(56) References Cited

U.S. PATENT DOCUMENTS

| | | | | |
|---|---|---|---|---|
| 5,136,882 | A | 8/1992 | Wada | |
| 6,748,811 | B1 * | 6/2004 | Iwanaga | G01F 1/662 73/861.27 |
| 8,776,613 | B2 * | 7/2014 | Dietz | G01F 15/185 73/861.28 |
| 10,845,224 | B2 | 11/2020 | Noui-Mehidi | |

(Continued)

FOREIGN PATENT DOCUMENTS

| | | | |
|---|---|---|---|
| CN | 102322906 | A | 1/2012 |
| DE | 11 2017 006 535 | T5 | 10/2019 |
| EP | 0790490 | B1 | 9/2005 |

(Continued)

OTHER PUBLICATIONS

Search Report dated Aug. 4, 2023 issued in corresponding European Application No. 23161323.3.

*Primary Examiner* — Marrit Eyassu
(74) *Attorney, Agent, or Firm* — Nath, Goldberg & Meyer; Jerald L. Meyer

(57) ABSTRACT

A flow measurement apparatus for measuring a parameter to determine a flow rate uses a flow chamber having an inflow section and an outflow section and a measurement section arranged between the inflow and outflow sections. The measurement section defines a transport direction for the fluid, with at least one ultrasonic device for transmitting and/or receiving ultrasonic waves arranged in the measurement section. The flow measurement apparatus has a flow deflection device configured to deflect the flow such that the flow extends at least regionally obliquely to the transport direction in the measurement section. The ultrasonic device is configured to transmit the ultrasonic waves through the fluid in one or more sound paths that are at least substantially perpendicular to the transport direction and/or to receive the ultrasonic waves from the fluid from one or more sound (Continued)

paths that are substantially perpendicular to the transport direction.

22 Claims, 4 Drawing Sheets

(56) References Cited

U.S. PATENT DOCUMENTS

| | | | | |
|---|---|---|---|---|
| 2021/0080302 | A1* | 3/2021 | Davey | G01F 1/662 |

FOREIGN PATENT DOCUMENTS

| | | | | |
|---|---|---|---|---|
| GB | 2238615 | A | 6/1991 | |
| WO | 2011/029261 | A1 | 3/2011 | |
| WO | WO-2018121134 | A1 * | 7/2018 | G01F 1/662 |
| WO | WO-2023275290 | A1 * | 1/2023 | G01F 1/668 |

* cited by examiner

FLOW MEASUREMENT APPARATUS

FIELD

The present invention relates to a flow measurement apparatus for measuring a parameter, in particular to determine a flow rate from the parameter. The parameter is measured on a flow formed from a fluid, wherein the flow measurement apparatus comprises a flow chamber having an inflow section and an outflow section and a measurement section arranged between the inflow section and the outflow section. In this respect, the measurement section defines a transport direction, wherein at least one ultrasonic device for transmitting and/or receiving ultrasonic waves is arranged in the measurement section.

BACKGROUND

Such flow measurement apparatus are, for example, used in pipelines to determine the volume flowing through the pipeline (i.e. the flow rate) of the fluid transported in the pipeline. The fluid can, for example, be a liquid, such as water, or gases, such as natural gas.

Due to, for example, the very high volumes transported in pipelines and the price of the transported fluid, it is of particular importance for such flow measurement apparatus to achieve a high measurement accuracy.

The flow measurement apparatus described herein use the measurement principle of emitting ultrasonic waves through the fluid. It is known to transmit the ultrasonic waves obliquely to the flow direction of the fluid through the fluid and to determine a transit time difference between the outward and return journey along the same path. The flow velocity of the fluid can then be determined based on the transit time difference. The measurement effect is in this respect based on the phenomenon that an ultrasonic signal transmitted with the flow direction has a shorter transit time than a signal transmitted opposite to the flow direction. The volume flowing through the flow measurement apparatus per unit of time can ultimately be determined from the flow velocity based on the known cross-section of the flow measurement apparatus.

To be able to transmit the ultrasonic signals obliquely to the flow direction of the fluid through the fluid, the transducers for transmitting and receiving the ultrasonic signals likewise have to be arranged obliquely to the flow direction and, moreover, spaced apart from one another along the flow direction. This results in a relatively large length of the flow measurement apparatus, which must be present.

Furthermore, considerable effort is usually required to shape the flow of the fluid as homogeneously as possible. A homogeneous flow is usually necessary to achieve the required high accuracy of the measurement. The homogenization of the flow can, for example, be achieved by so-called "flow conditioners" that reduce or completely prevent turbulences or flows extending obliquely to the flow direction. Such flow conditioners are usually integrated into the inlet of the flow measurement apparatus, which increases the length of the inlet and also further increases the overall length required by the flow measurement apparatus.

It can be seen that conventional flow measurement apparatus have large installation lengths. It is therefore an underlying object of the invention to specify a flow measurement apparatus of the above-mentioned kind that is more compact in design and nevertheless ensures a high accuracy of the measurement result.

SUMMARY

This object is satisfied by a flow measurement apparatus characterized in that a flow deflection device is provided (preferably at least in the inflow section) and is configured to deflect the flow such that the flow extends at least regionally obliquely to the transport direction in the measurement section. Furthermore, the ultrasonic device is configured to transmit the ultrasonic waves through the fluid in one or more sound paths that are at least substantially perpendicular to the transport direction and/or to receive the ultrasonic waves from the fluid from one or more sound paths that are at least substantially perpendicular to the transport direction.

Compared to known flow measurement apparatus, the invention takes a completely new approach. Instead of generating a flow that is as homogeneous and straight as possible through the measurement apparatus and inclining the transducers/sound paths relative to the flow direction, a cross flow is generated according to the invention that can then be detected with sound paths that are not inclined.

The invention thus completely abandons the basic principle usually used, according to which the flow in the flow measurement apparatus should be as homogeneous and straight as possible. Instead, according to the invention, a flow is intentionally generated that extends at least regionally obliquely to the transport direction. This component extending transversely to the transport direction can then be detected with the sound paths perpendicular to the transport direction or with the ultrasonic waves transmitted along the sound paths (since the flow component that extends perpendicular to the transport direction can be detected with the sound paths). As explained in more detail below, the transport direction is in particular the direction in which the fluid is transported and/or in which the fluid would flow if the flow measurement apparatus had no flow deflection devices.

Contrary to the prevailing opinion to date, it has surprisingly been shown that very accurate measurement results can be achieved despite the flow not extending in a straight and homogeneous manner. Due to the fact that the sound paths extend perpendicular to the transport direction, the transducers used to generate the ultrasonic waves can also be attached perpendicular to the transport direction and therefore no longer have to be spaced apart from one another along the transport direction. The length of the flow measurement apparatus along the transport direction can be greatly reduced in this way, which was previously not possible with flow measurement apparatus according to the prior art.

The invention thus completely abandons the previously unutilized way of thinking that the flow to be measured should extend as uniformly as possible and along the transport direction, for which purpose flow conditioners and long inlet sections, etc. are required, and that the flow to be measured should, where possible, only have axial components so that sufficiently accurate measurement results can be obtained via the previous angled measurement paths. According to the invention, the flow is intentionally e.g. given a swirl and thus, generally speaking, a non-axial component that can then be measured by means of the perpendicular sound paths.

Moreover, it has been shown as a further advantage that the flow measurement apparatus according to the invention is very robust against disruptions (i.e. inhomogeneities in the flow of the fluid) since the disruptions are at least significantly reduced by the flow deflection device.

Even further aspects of the invention will be described in the following.

In normal operation, the fluid to be measured first flows through the flow section, is then directed from the flow section into the measurement section and finally passes from the measurement section into the outflow section. The inflow section and the outflow section can, for example, be coupled with pipelines from which the fluid flows into the inflow section and into which the fluid is introduced from the outflow section.

The inflow and outflow sections can, for example, have connection means for connecting the flow measurement apparatus to the pipeline, in particular in the form of a flange with screw holes.

The inflow section, the measurement section and the outflow section together form the flow chamber, i.e. the spatial region in the measurement apparatus that is flowed through by the fluid.

The transport direction in particular results from the shape of the measurement section, i.e. the shape of the flow chamber in the measurement section (but possibly also together with the inflow and outflow section). The transport direction is in particular the direction in which the fluid is transported and/or in which the fluid would flow if the flow measurement apparatus did not have any flow deflection devices. The measurement section, but also the entire flow chamber, can in particular be formed by a straight pipe. In this case, the transport direction is then the longitudinal direction of the pipe. Accordingly, the transport direction can be the direction in which the fluid mainly flows in the flow measurement apparatus, e.g. to move from the inflow section to the outflow section. Accordingly, the transport direction could also be referred to as the main flow direction, i.e. the flow direction that would exist without the flow deflection devices.

The flow deflection devices give the fluid or the flow of the fluid a component that does not extend along the transport direction, but at least regionally obliquely to the transport direction. The angle between the transport direction and the deflected flow can be at least 25°, 30° or 40° in this respect. As will be explained in more detail later, the flow deflection device can, for example, have blades arranged in the flow chamber that laterally deflect the fluid and thus introduce a kind of rotation or swirl into the flow. The component of the flow that does not only extend along the transport direction can then be measured by means of the ultrasonic device arranged in accordance with the invention.

The deflected flow can describe an arc or a partial circle, in particular viewed along the transport direction.

A flow is generally to be understood as the directed movement of a fluid.

The ultrasonic device comprises at least one ultrasonic transmitter and one ultrasonic receiver that are arranged at oppositely disposed ends of one of the sound paths. Units that combine ultrasonic transmitters and ultrasonic receivers, i.e. so-called transducers, can also be arranged at oppositely disposed ends of a sound path. Accordingly, the ultrasonic unit can comprise one or more pairs of transducers.

In particular due to the transducers, the transit time of ultrasonic waves through the sound path can be easily measured once in the outward direction and once in the return direction in order thus to determine a transit time difference, as will be explained in more detail later.

As mentioned, the sound path is at least substantially perpendicular to the transport direction so that two transducers belonging to one sound path are each arranged at the same position, viewed along the transport direction. A spacing apart of the transducers along the transport direction is not necessary. A plurality of sound paths can also be formed that are in particular parallel to one another and preferably lie in the same plane, with the transport direction forming a normal to this plane. An even more accurate measurement result can be achieved by a plurality of sound paths.

If there are flows in a sound path that extend obliquely to the transport direction and furthermore with at least one component along the sound path, the transit time through the sound path is shortened in one direction and the transit time is extended in the opposite direction. The thus resulting actual measured value of the transit time difference is accumulated via the signal of ultrasonic waves running to and fro. According to the invention, it is actually not important that the angle of the flow to the sound path is identical everywhere along the sound path. Here, it has namely surprisingly been shown according to the invention that, although the measurement signal of the ultrasonic waves passes through different angles, the evaluation can take place with a single angle (e.g. determined experimentally), wherein the flow velocity and thus the flow rate can then nevertheless be determined very precisely.

The components used in flow measurement apparatus of the prior art can likewise be used for the flow measurement apparatus according to the invention. Thus, the same ultrasonic devices can be used, but are installed in a different position according to the invention. For example, the same electronics can also be used for evaluation, wherein the formula used for evaluation changes only slightly. Overall, the flow measurement apparatus of the invention can e.g. be designed from existing modular systems for flow measurement apparatus, whereby the manufacture of measurement apparatus can be simple and inexpensive. It is moreover of advantage that the transducers of the ultrasonic device do not have to be installed inclined, but rather in a perpendicular manner. It is thereby e.g. possible to produce the measurement section using a conventional three-axis milling machine since the bores for the transducers can be introduced perpendicular to the longitudinal direction of e.g. the pipe used for the measurement section.

According to the invention, the sound paths extend at least substantially perpendicular to the transport direction. This can in particular mean that the sound path or sound paths include an angle with the transport direction that deviates by a maximum of 5°, preferably a maximum of 3°, further preferably a maximum of 1°, further preferably a maximum of 0.5°, from a perpendicular to the transport direction. Minor deviations from the perpendicular still allow a measurement according to the underlying measurement principle of the invention. However, the sound paths preferably, as far as possible, extend along/parallel to the perpendicular to the transport direction.

According to a first embodiment, at least one of the sound paths or all of the sound paths extend off-center in the measurement section. In this connection, off-center can mean that the sound paths extend off-center in relation to the cross-section of the measurement section. For example, if the measurement section is tubular, i.e. hollow cylindrical, the sound path or sound paths do not extend through the center of the circle that forms the cross-section. With a rectangular cross-section, the sound path or sound paths do not extend through the diagonal intersection point or, with any desired cross-sections, the sound path or sound paths do not extend through the center of gravity of the cross-section. The normal to the cross-section can in particular extend along the main flow direction.

The off-center arrangement of the sound path or sound paths is advantageous since the measurement effects at both sides of the center point can cancel one another out in the case of a sound path extending through the center of the cross-section so that no meaningful transit time difference measurement is possible there.

According to a further embodiment, the sound paths each extend in a straight line between the transducers. Each sound path can only extend along a single straight line. This means that the sound paths extend on a direct path between the transducers so that no deflection and/or diversion of the ultrasonic waves takes place between the transducers. The sound paths preferably extend over their entire length without interruption only through the fluid, i.e. they do not strike a wall or a reflector, for example.

According to a further embodiment, a plurality of mutually parallel sound paths are present. Due to the plurality of sound paths, a measurement can take place at different positions in the cross-section of the measurement section. Furthermore, measurements can be simultaneously performed with a plurality of sound paths. Both aspects make it possible to determine the overall flow rate with greater accuracy. As the number of sound paths increases, the accuracy in particular increases with the square root of the number of sound paths.

According to a further embodiment, at least two sound paths are present that in particular extend perpendicular to one another in the projection onto the cross-section of the measurement section. Mutually perpendicular sound paths allow the arrangement of larger transducers, such as those required for measurements in liquid media. The flow measurement apparatus can be further reduced in this way. The sound paths extending perpendicular to one another can intersect or extend separately from one another.

According to a further embodiment, the flow deflection device has deflection surfaces arranged in the flow chamber. The deflection surfaces can in particular project into the flow chamber and/or bound the flow chamber. The flow deflection device is in particular at least partly located in the inflow section.

The deflection surfaces can preferably be arranged transversely to the transport direction. The deflection surfaces can, for example, be the surfaces of an internal thread of a pipeline. The surfaces of the internal thread can be excessively large in this respect. Alternatively or additionally, the deflection surfaces can comprise a plate with obliquely drilled holes, wherein the holes deflect the fluid transversely to the transport direction.

The deflection surfaces preferably at least regionally have an angle to the transport direction of at least 25°, 30° or 40°. The angle can in particular also be less than 60°, 70° or 75°. Due to flow deflection devices arranged at an angle in this way, the flow can have a similar angle to the transport direction after the guidance by the flow deflection devices.

All the variants of the flow deflection device mentioned herein are preferably immovable flow deflection devices. This means that the flow deflection devices are fixedly installed in the flow measurement apparatus.

According to a further embodiment, the flow deflection device has at least one swirl generator comprising a plurality of blades, wherein the blades extend from a central connection section toward the wall of the flow chamber. The connection section can in particular be centrally located in the cross-section of the flow chamber. The blades can then extend radially from the connection section toward the wall bounding the flow chamber. The blades are preferably inclined to the transport direction and thus guide the flow in a direction transverse to the transport direction, preferably tangentially to the cross-section (in the case of a round cross-section). The flow deflection device can, for example, have two, three, four, five, six, seven, eight, nine or ten blades. Even more blades can be provided, for example at least 15, 18 or 20. Due to such a high number of blades, a better flow guidance can be achieved during the deflection. A maximum of e.g. 30 or 40 blades can be provided.

According to a further embodiment, the blades each start and end at the same position, viewed along the transport direction. The blades preferably each have a corresponding geometry. The blades can therefore all be identical to one another. Furthermore, the blades can all have the same blade angle, i.e. the same angle to the transport direction, the same profile and/or the same material, etc. The blades can also have an inclination that changes along the transport direction. The angles specified herein may in particular refer to the steepest inclination of each blade.

Due to the blades or generally due to the flow deflection device, more than 50%, preferably more than 70%, particularly preferably more than 90%, of the area of the cross-section, viewed along the transport direction, can be covered by the blades or by the flow deflection device. The area can in particular be determined by projecting the flow deflection device along the transport direction onto a cross-sectional plane of the measurement section. Due to this relatively high coverage, it is ensured that almost all of the fluid is deflected by the flow deflection device and thus no turbulence occurs in the flow, for example.

According to a further embodiment, the flow deflection device reduces the flow cross-section (at the position of the flow deflection device) by less than 15%, preferably by less than 10% or less than 3%. The flow deflection device can therefore be formed in a relatively thin and flow-favorable manner so that the flow cross-section is only minimally reduced. In practice, this can result in a very small pressure loss. The pressure loss coefficient $\zeta$ can, for example, be 1.5, which corresponds to a pressure loss of only around two 90° bends in a pipe. Despite the deflection of the fluid by the flow deflection device, a very small pressure loss can therefore be achieved.

According to a further embodiment, the flow deflection device is configured to deflect the flow such that the deflected flow is at least substantially axially symmetrical about an axis extending along the transport direction. For example, in the aforementioned swirl generator comprising blades, the connection section can be arranged along this axis. The deflected flow can flow around this axis downstream of the flow deflection device.

The swirl generator and also generally the flow deflection device can accordingly be rotationally symmetrical about a central axis of the flow chamber.

According to a further embodiment, a flow return device is present that is preferably arranged in the outflow section, wherein the flow return device is configured to deflect the deflected flow (coming from the measurement section) again such that the flow extends at least substantially parallel to the transport direction or is deflected at least in the direction of a flow parallel to the transport direction. The flow return device can therefore serve to ensure that a homogenous flow extending in a straight line is present again downstream of the outflow section. It is understood that the flow downstream of the outflow section does not have to extend in a parallel and straight manner in a mathematical sense. Small turbulences or small cross currents may still be present.

According to a further embodiment, the flow return device corresponds to the flow deflection device, wherein the flow return device and the flow deflection device are preferably identical parts. By using identical parts, the production costs for the flow measurement apparatus can be reduced. Furthermore, it has been shown that by using the same flow deflection and flow return devices, a relatively homogeneous flow extending in a straight line can be generated downstream of the flow measurement apparatus.

The flow measurement apparatus is preferably configured to measure the parameter independently of the flow direction. This means that the fluid can be introduced into the measurement apparatus both through the inflow section and through the outflow section. For this purpose, the measurement apparatus can be designed symmetrically, in particular with regard to the flow deflection device and flow return device and preferably also with regard to the shape of the flow chamber, so that the flow measurement apparatus can be used bidirectionally. In other words, the flow measurement apparatus is symmetrical at least with respect to the component that comes into contact with the fluid. The symmetry can in this respect in particular be present with respect to a plane in which the sound paths extend.

In particular by using identical parts for the flow deflection device and flow return device, the apparatus can be operated both in the transport direction and opposite thereto. The measurement apparatus can therefore be installed in existing pipelines regardless of direction.

According to a further embodiment, the flow deflection device comprises at least one supply line which opens into the flow chamber obliquely or transversely to the transport direction and through which a fluid can be introduced into the flow chamber.

Alternatively or in addition to the aforementioned deflection surfaces, the flow deflection device can therefore also be based on a completely different principle, namely on the introduction of a fluid transversely or obliquely to the transport direction, whereby a flow is then ultimately generated in the measurement section that extends at least regionally obliquely to the transport direction. The position of the opening of the supply line is in particular off-center, preferably tangential in the case of a round cross-section. Two supply lines can further preferably be provided that are disposed at oppositely disposed sides of the flow chamber. If there are a plurality of supply lines, the supply lines can be arranged spaced apart from one another along the transport direction.

The introduced fluid can either be the fluid to be measured, of which, for example, a portion has been branched off in advance and then re-enters the flow chamber through the supply line. In the flow chamber, this branched-off fluid can then mix with the (remaining) non-branched-off fluid. It would also be possible to branch off all the fluid to be measured and then to reintroduce it into the flow chamber through two supply lines, for example. Further alternatively or additionally, the fluid introduced through the supply line can, however, also be an additional fluid, such as compressed air.

A spatial curvature, e.g. of the inlet section, can also serve as a further or additional alternative to the configuration of the flow deflection device. Accordingly, the flow deflection device can comprise a single or a double bend. The bends can each be 90° bends that e.g. comprise a radius with the size of the diameter of the inlet section. With a bend or a double bend, a flow is also in each case produced that extends transversely to the transport direction and that can then again be measured by the sound paths extending in a perpendicular manner.

All the flow deflection devices mentioned herein can in particular generate a circular or circulating flow in the measurement section.

According to a further embodiment, the inflow section, the measurement section and the outflow section together form a pipe, in particular a straight pipe. Furthermore, the inflow section, the measurement section and the outflow section can together have a length of less than 1.5 times, preferably of less than 1.2 times, the pipe diameter. Due to the perpendicular arrangement of the sound paths and thus also due to the perpendicular arrangement of the transducers, the flow measurement apparatus can, as mentioned, be formed as particularly short and space-saving. Flow measurement apparatus are usually significantly longer and have a length of around three times the pipe diameter. Due to the significant shortening of the flow measurement apparatus, a considerable gain in space can thus be achieved, wherein the space gained can in turn be used sensibly. For example, a flow conditioner can be arranged upstream of the inflow section to homogenize the flow upstream of the flow deflection device.

The flow chamber can be tubular with a cross-section, in particular a circular cross-section.

The pipe forming the flow chamber is preferably fixed and immovable. The circular cross-section can be present almost everywhere in the flow chamber, with the exception of the connection points for the transducers, for example.

According to a further embodiment, the flow measurement apparatus comprises an evaluation unit that is coupled to the ultrasonic device and that is configured to carry out a transit time difference measurement (by means of the ultrasonic device) and to determine the parameter. In the evaluation unit, an effective angle can be stored that indicates the angle between the deflected flow and the sound path or sound paths. As mentioned above, the effective angle can e.g. have been determined experimentally.

The measured parameter of the fluid can be the transit time of the ultrasonic waves along the sound path. The measurement on the outward journey and on the return journey can result in a transit time difference. From this, the flow velocity of the fluid along the transport direction can then first be determined. This can in particular be achieved with the formula $$v_p = \frac{L}{2 * \tan(\alpha)} \cdot \left(\frac{1}{t_{AB}} - \frac{1}{t_{BA}}\right).$$

In this respect, $v_p$ is the flow velocity of the fluid along the transport direction, $\alpha$ is the angle between the deflected fluid and the sound path, L is the length of the sound path (i.e. the distance between two transducers of the same sound path), $t_{AB}$ is the transit time in the outward direction of the sound path, and $t_{BA}$ is the transit time in the return direction of the sound path.

The flow velocity multiplied by the cross-sectional area (i.e. the cross-sectional area in the region of the sound path) then results in the volume flowing through the flow measurement apparatus per unit of time.

Furthermore, the invention relates to a method for measuring a parameter, in particular for determining a flow rate, of a flow formed from a fluid, wherein the fluid flows in a transport direction. The method according to the invention is characterized in that the flow is deflected by means of a flow deflection device such that the flow extends at least regionally obliquely to the transport direction in a measurement section. Moreover, according to the invention, ultrasonic waves are transmitted through the fluid in one or more sound paths that are at least substantially perpendicular to the transport direction and/or are received from the fluid from one or more sound paths that are at least substantially perpendicular to the transport direction.

The statements on the flow measurement apparatus according to the invention apply accordingly to the method according to the invention. This in particular applies with respect to advantages and embodiments. It is furthermore understood that all the features and embodiments mentioned herein can be combined with one another, unless explicitly stated otherwise. This in particular applies to the combination of the various variants of the flow deflection devices.

BRIEF DESCRIPTION OF THE DRAWINGS

The invention will be described purely by way of example with reference to the drawings in the following. There are shown.

DETAILED DESCRIPTION

Figure 1:
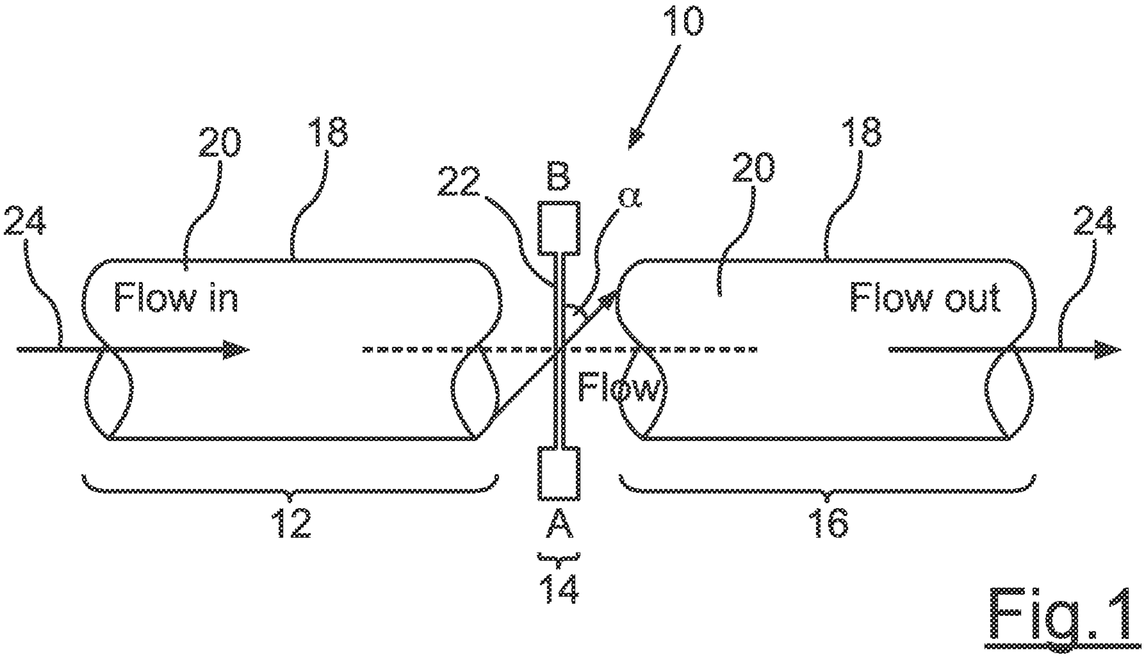
FIG. 1 a schematic view of a flow measurement apparatus.

FIG. 1 schematically shows a flow measurement apparatus 10. The flow measurement apparatus 10 comprises an inflow section 12, a measurement section 14 adjoining the inflow section 12 and an outflow section 16 adjoining the measurement section 14. These sections are formed by a continuous pipe 18 that defines a flow chamber 20.

Two ultrasonic transducers A, B are provided in the measurement section 14 and transmit ultrasonic waves to the respective other transducer A, B. The propagation path of the ultrasonic waves defines a sound path 22 in this respect.

During operation of the flow measurement apparatus 10, a fluid F, for example natural gas, flows into the inflow section 12 along a transport direction 24. The fluid F is then deflected in the inflow section 12 by a flow deflection device (not shown in FIG. 1) so that the flow of the fluid F extends at least regionally obliquely to the transport direction 24. The inclined course is indicated by an angle α that defines the angle between the sound path 22 and the course of the deflected flow.

Based on the fluid F flowing obliquely to the sound path 22, a transit time difference can be measured by means of the transducers A, B, from which transit time difference the volume flowing through the flow measurement apparatus 10 per unit of time can be determined.

A flow return device (also not shown in FIG. 1) is provided in the outflow section 16 and deflects the oblique course of the deflected flow toward the transport direction 24 again. The fluid F leaves the flow measurement apparatus 10 after the deflection by the flow return device.

Figure 2:
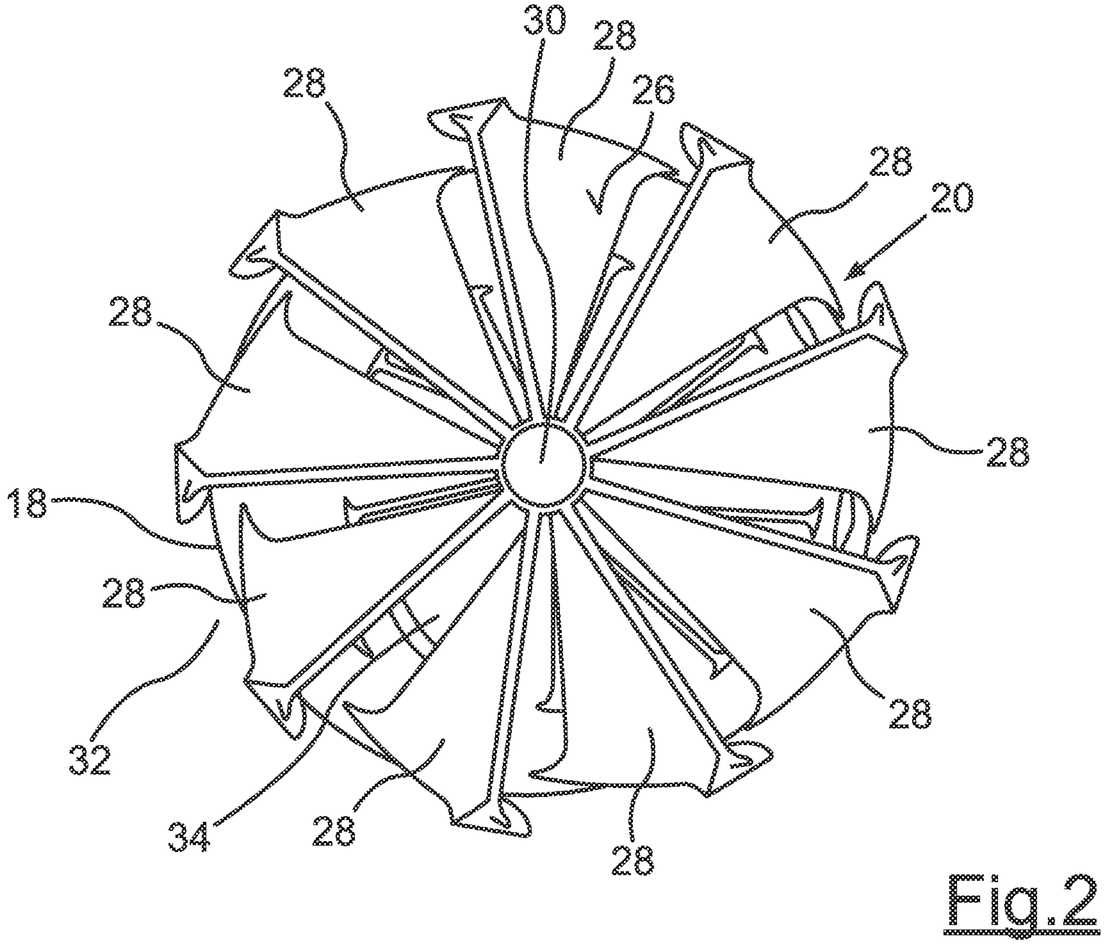
FIG. 2 a view of a flow deflection device and a flow return device, viewed along the transport direction.

FIG. 2 shows a flow deflection device configured as a swirl generator 26. The swirl generator 26 comprises nine blades 28 arranged rotationally symmetrically around a central connection section 30. The blades 28 originate from the connection section 30 and extend up to a wall 32 of the pipe 18 and in particular merge into the wall 32.

In FIG. 2, a further swirl generator 34, which serves as a flow return device, can also be partly seen behind the swirl generator 26. The two swirl generators 26, 34 are designed as identical parts, wherein the further swirl generator 34 is inserted into the pipe 18 such that it reduces the cross flow of the deflected fluid F.

Figure 3:
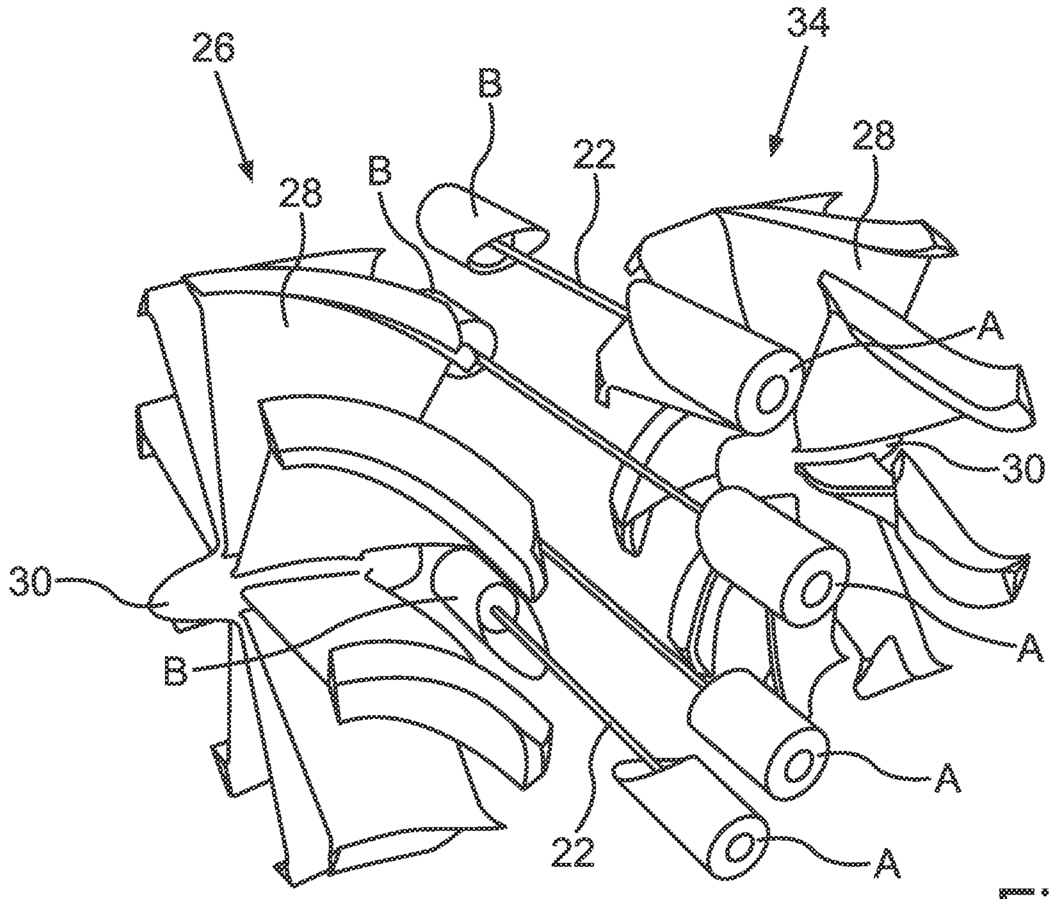
FIG. 3 a schematic perspective view of the flow deflection device and the flow return device and of the ultrasonic device.
Figure 4:
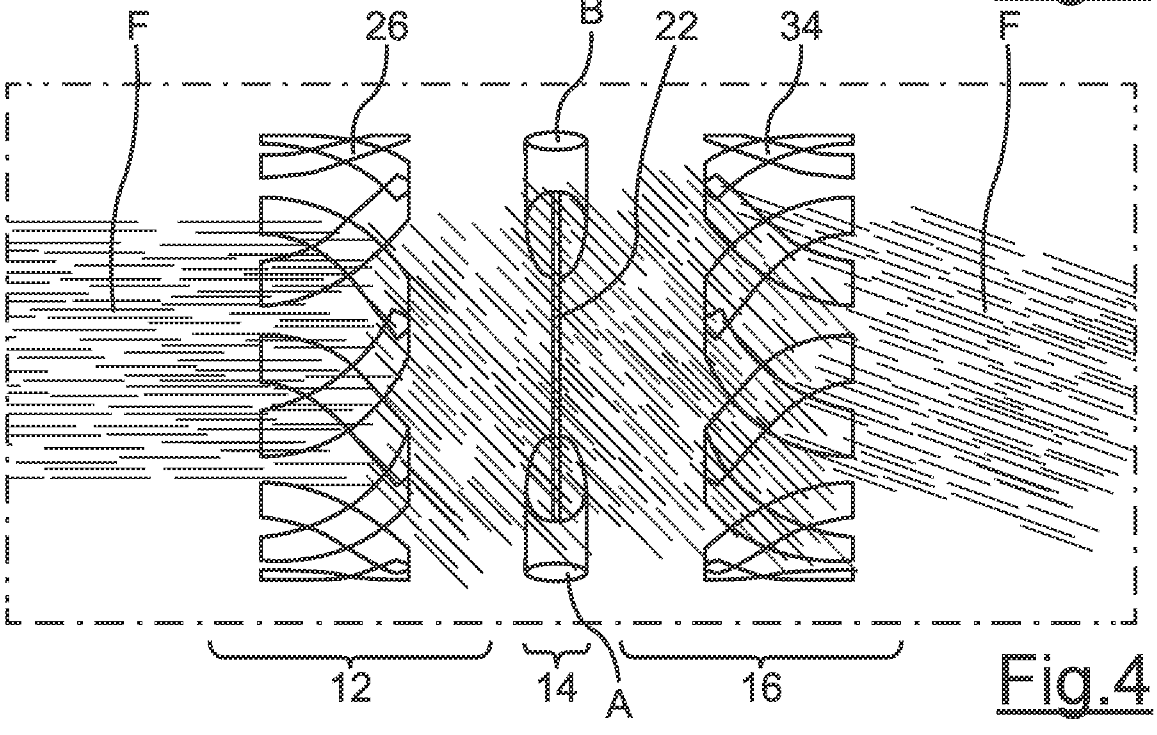
FIG. 4 the course of the flow through the flow measurement apparatus.

The swirl generators 26, 34 are shown in perspective and in a side view in FIGS. 3 and 4. As can be seen in FIG. 3, between the swirl generators 26, 34, four pairs of transducers A, B are arranged that each define a sound path 22 between them. The transducers A, B are all arranged in one plane in the measurement section 14, to which plane the transport direction 24 forms a normal.

The flow of the fluid f being formed is shown in FIG. 4. It can be seen that the fluid F flowing in homogenously and in a straight line is deflected by the swirl generator 26 in a direction oblique to the transport direction 24 and also flows through the sound paths 22 in this deflected direction, whereby a measurement is made possible. The further swirl generator 34 then reduces the transverse component of the flow so that the flow flows with a reduced transverse component through the outlet section 16 and leaves it again in the same way.

Figure 5:
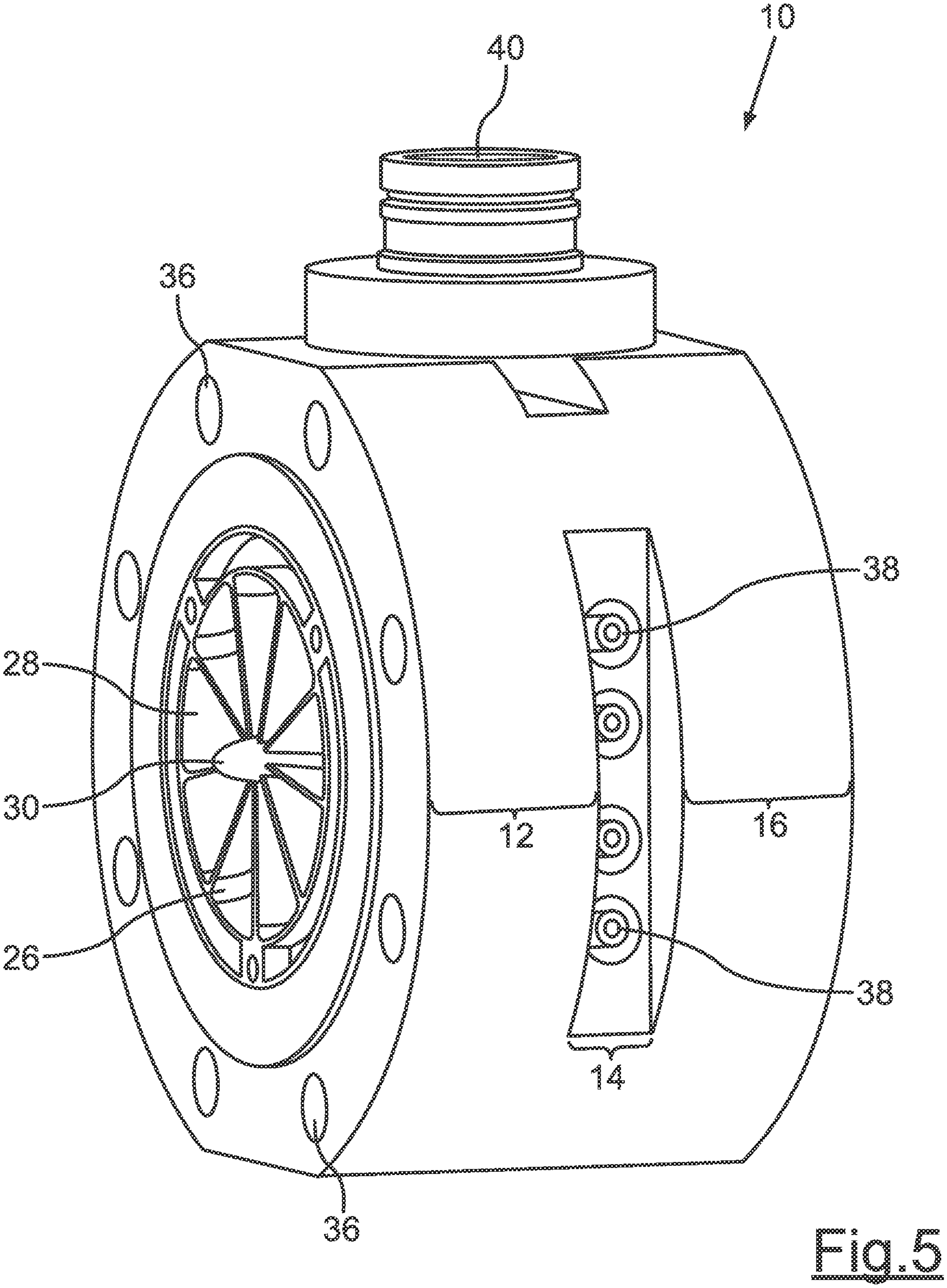
FIG. 5 a flow measurement apparatus in a perspective view.

FIG. 5 shows a flow measurement apparatus 10 from the outside in a perspective view. The flow measurement apparatus 10 comprises two end faces, one of which is visible in FIG. 5. Boreholes 36 are formed in the end faces and allow a bolting to a pipeline (not shown). The swirl generator 26 is furthermore located directly in the plane formed by the end face so that the swirl generator 26 is arranged at the inlet of the flow measurement apparatus 10. The measurement section 14 is centrally located in the flow measurement apparatus 10, wherein electrical connectors 38 for the transducers A, B can be seen in FIG. 5 that project from a side wall of the flow measurement apparatus 10.

A fastening flange 40 for evaluation electronics (not shown) is provided on an upper side of the flow measurement apparatus 10.

The flow measurement apparatus 10 has a symmetrical design so that the flowing through by the fluid F to be measured can take place bidirectionally. Accordingly, the further swirl generator 34 can be arranged flush in the end face not shown in FIG. 5.

Figure 6:
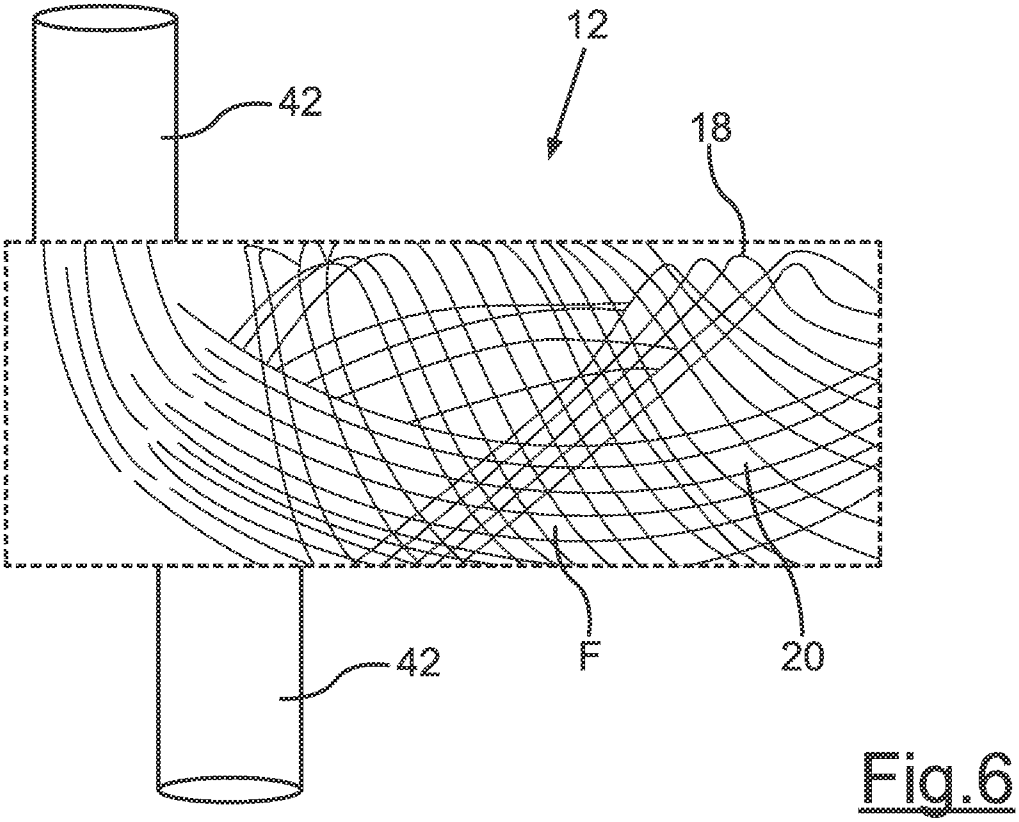
FIG. 6 an embodiment of the flow deflection device with incoming supply lines.
Figure 7:
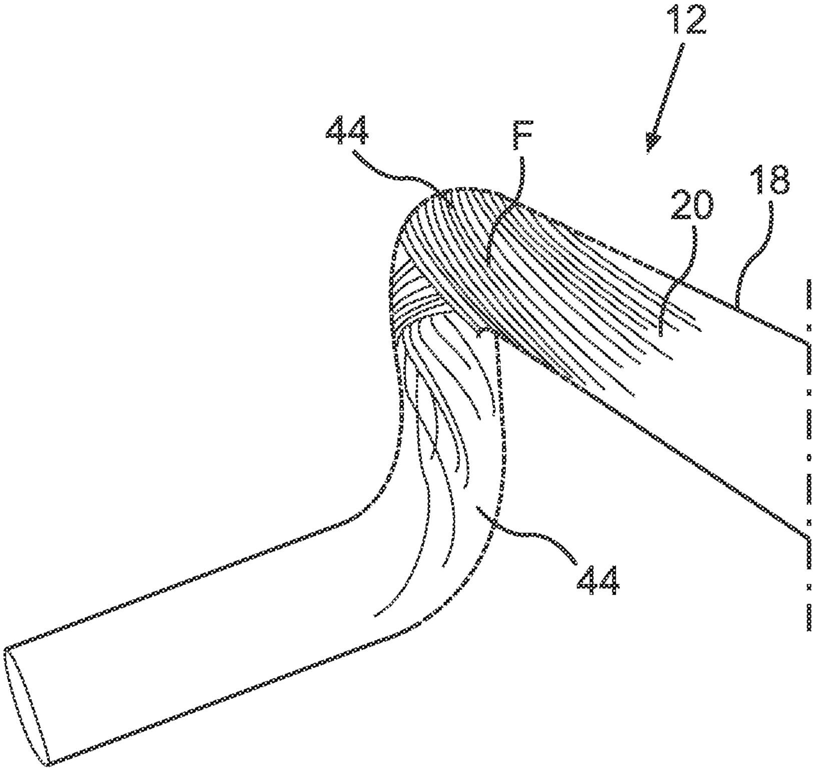
FIG. 7 a further embodiment of the flow deflection device comprising a double bend.

FIGS. 6 and 7 show two further embodiments for the flow deflection device. According to FIG. 6, the flow deflection device comprises two supply lines 42 that open tangentially into the pipe 18. In this respect, the supply lines 42 extend at right angles to the course of the pipe 18 before opening. FIG. 6 shows the course of the flow, wherein it can be seen that the flow is again given a component transverse to the transport direction 24 (i.e. to the direction of extent of the pipe 18).

According to FIG. 7, the flow deflection device comprises a double bend with two bends 44 about 90° each. The resulting flow is also again shown in FIG. 7. It can be seen that, according to this embodiment, the flow deflection device also deflects the flow such that a kind of swirl or a deflection takes place transversely to the transport direction 24. Due to this deflection, a meaningful measurement of the transit time difference can then take place with the sound paths 22 extending perpendicular to the transport direction 24.

As can in particular be seen in FIG. 5, the flow measurement apparatus 10 can be very compact since only a very short pipe length has to be provided in the flow measurement apparatus 10 for the transducers A, B. Despite the necessary deflection of the fluid F, it has been shown in practice that very accurate measurements of the flow velocity and thus of the volume flowing through the measurement apparatus 10 are possible.

REFERENCE NUMERAL LIST

10 flow measurement apparatus
12 inflow section
14 measurement section
16 outflow section
18 pipe
20 flow chamber
22 sound path
24 transport direction
26 swirl generator
28 blade
30 connection section
32 wall
34 further swirl generator
36 borehole
38 connector
40 fastening flange
42 supply line
44 bend
A, B transducer
F fluid
α angle

The invention claimed is:

1. A flow measurement apparatus for measuring a parameter for determining a flow rate, of a flow formed from a fluid, wherein the flow measurement apparatus comprises a flow chamber having an inflow section, an outflow section and a measurement section arranged between the inflow section and the outflow section, wherein the measurement section defines a transport direction, wherein at least one ultrasonic device for transmitting and/or receiving ultrasonic waves is arranged in the measurement section, the flow measurement apparatus comprising:

a flow deflection device arranged at least in the inflow section, and configured to deflect the flow such that the flow extends at least regionally obliquely to the transport direction in the measurement section, and the ultrasonic device is configured to transmit the ultrasonic waves through the fluid in one or more sound paths that are at least substantially perpendicular to the transport direction and/or to receive the ultrasonic waves from the fluid from one or more sound paths that are at least substantially perpendicular to the transport direction, wherein a plurality of mutually parallel sound paths are present, and wherein transducers are arranged at oppositely disposed ends of the sound paths.

2. The flow measurement apparatus according to claim 1 that is configured to determine a flow rate.

3. The flow measurement apparatus according to claim 1, wherein at least one of the sound paths or all the sound paths extends/extend off-center in the measurement section.

4. The flow measurement apparatus according to claim 1, wherein a plurality of mutually parallel sound paths and/or at least two sound paths extending perpendicular to one another are present.

5. The flow measurement apparatus according to claim 1, wherein the flow deflection device has deflection surfaces arranged in the flow chamber.

6. The flow measurement apparatus according to claim 1, wherein the flow deflection device has at least one swirl generator comprising a plurality of blades that extend from a central connection section toward a wall of the flow chamber.

7. The flow measurement apparatus according to claim 6, wherein the blades start at the same position and end at the same position, viewed along the transport direction.

8. The flow measurement apparatus according to claim 7, wherein the blades each have a corresponding geometry.

9. The flow measurement apparatus according to claim 1, wherein the flow deflection device reduces a flow cross-section at the position of the flow deflection device by less than 15%.

10. The flow measurement apparatus according to claim 1, wherein the flow deflection device reduces the flow cross-section at the position of the flow deflection device by less than 10%.

11. The flow measurement apparatus according to claim 1, wherein the flow deflection device is configured to deflect the flow such that the deflected flow is axially symmetrical about an axis extending along the transport direction.

12. The flow measurement apparatus according to claim 1, wherein a flow return device is provided that is configured to deflect the deflected flow again such that the flow extends parallel to the transport direction.

13. The flow measurement apparatus according to claim 12, wherein the flow return device is arranged in the outflow section.

14. The flow measurement apparatus according to claim 12, wherein the flow return device corresponds to the flow deflection device.

15. The flow measurement apparatus according to claim 14, wherein the flow return device and the flow deflection device are identical parts.

16. The flow measurement apparatus according to claim 1, wherein the flow measurement apparatus is symmetrical at least with respect to a component that comes into contact with the fluid.

17. The flow measurement apparatus according to claim 1, wherein the flow deflection device comprises at least one supply line which opens into the flow chamber obliquely or transversely to the transport direction and through which a fluid can be introduced into the flow chamber.

18. The flow measurement apparatus according to claim 1, wherein the inflow section, the measurement section and the outflow section together form a pipe and together have a length of less than 1.5 times the pipe diameter.

19. The flow measurement apparatus according to claim 18, wherein the pipe is a straight pipe.

20. The flow measurement apparatus according to claim 19, wherein the pipe has a length of less than 1.2 times the pipe diameter.

21. The flow measurement apparatus according to claim 1, wherein the flow measurement apparatus comprises an evaluation unit that is coupled to the ultrasonic device and that is configured to carry out a transit time difference measurement and to determine the parameter.

22. A method for measuring a parameter of a flow formed from a fluid, wherein the fluid flows in a transport direction, the method comprising:

deflecting the flow by means of a flow deflection device such that the flow extends at least regionally obliquely to the transport direction in a measurement section, and transmitting ultrasonic waves through the fluid in one or more sound paths that are at least substantially perpendicular to the transport direction and/or are received from the fluid from one or more sound paths that are at least substantially perpendicular to the transport direction, wherein a plurality of mutually parallel sound paths are present, and wherein transducers for the ultrasonic waves are arranged at oppositely disposed ends of the sound paths.

* * * * *